United States Patent [19]
Strömberg

[11] Patent Number: 5,818,427
[45] Date of Patent: Oct. 6, 1998

[54] CONTROL DEVICE FOR POINTING

[76] Inventor: Rolf Strömberg, Stavangergatan 8, S-164 33 Kista, Sweden

[21] Appl. No.: 793,105
[22] PCT Filed: Aug. 17, 1995
[86] PCT No.: PCT/SE95/00939
  § 371 Date: Feb. 25, 1997
  § 102(e) Date: Feb. 25, 1997
[87] PCT Pub. No.: WO96/07159
  PCT Pub. Date: Mar. 7, 1996

[30] Foreign Application Priority Data

Aug. 26, 1994 [SE] Sweden ................................ 9402858

[51] Int. Cl.⁶ ........................................................ G09G 5/08
[52] U.S. Cl. ........................ 345/163; 248/918; 345/164; 364/709.01
[58] Field of Search ................................. 345/157, 163, 345/164, 166, 169, 167; 248/918; 361/686; 364/709.01

[56] References Cited

U.S. PATENT DOCUMENTS

| 4,712,101 | 12/1987 | Culver . | |
|---|---|---|---|
| 4,928,093 | 5/1990 | Rahman . | |
| 5,049,863 | 9/1991 | Oka | 345/163 |
| 5,115,231 | 5/1992 | Avila et al. . | |
| 5,317,336 | 5/1994 | Hall | 345/164 |
| 5,621,436 | 4/1997 | Solhjell | 345/163 |
| 5,726,684 | 3/1998 | Blankenship et al. | 345/163 |

*Primary Examiner*—Brent A. Swarthout
*Attorney, Agent, or Firm*—Bacon & Thomas, PLLC

[57] ABSTRACT

A control device comprises a rotatable and translatable bar for controlling a pointing device such as a mouse or mouse-pen associated with the control device. A key for the clicking function is also provided. It is possible to adjust the control device for different types of pointing devices and a friction reducing system is also described.

22 Claims, 4 Drawing Sheets

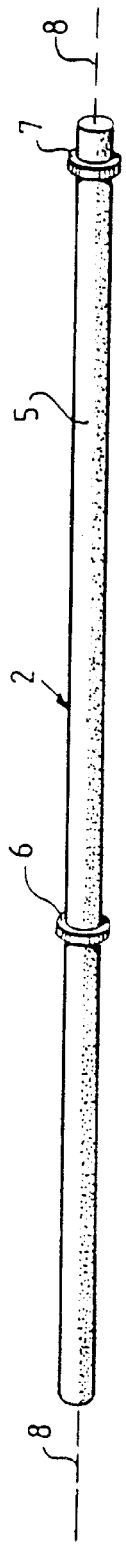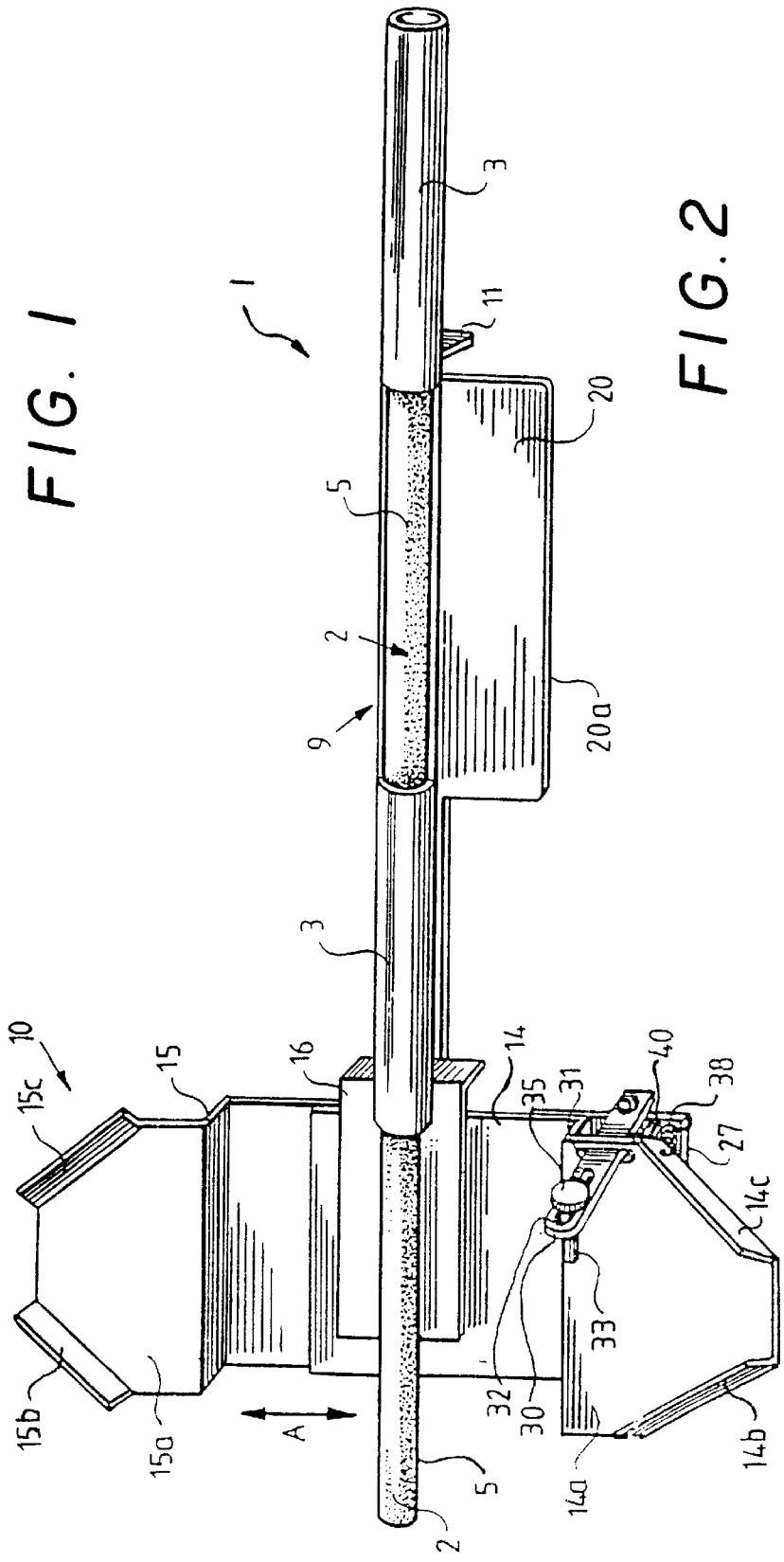

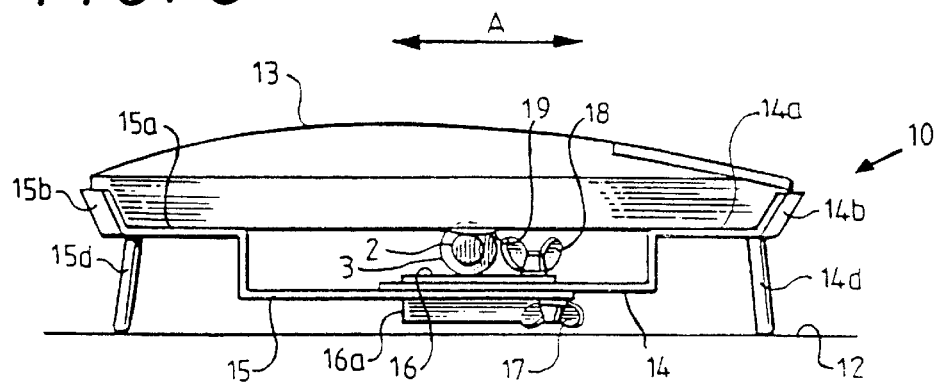
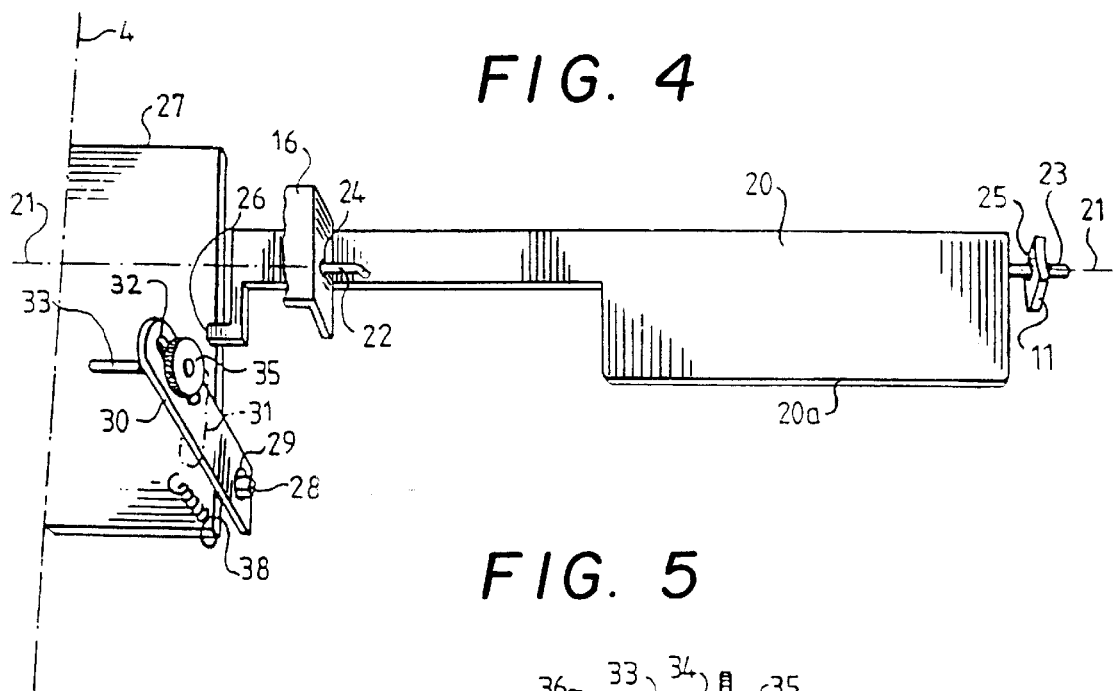
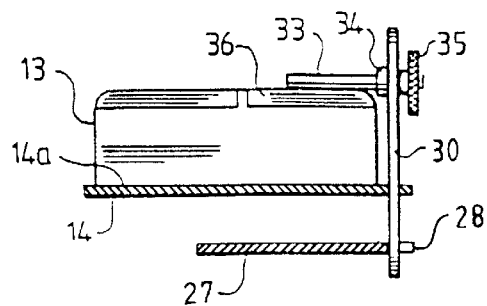

FIG. 6
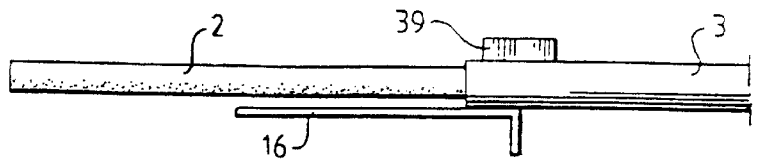
FIG. 7
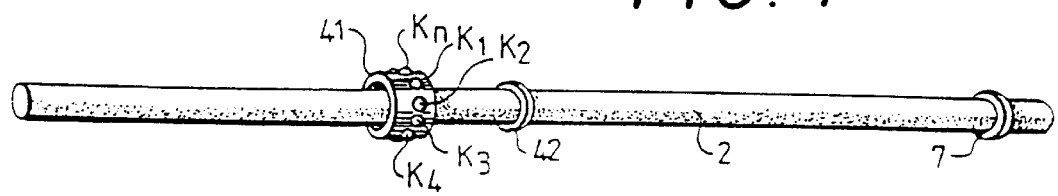
FIG. 8
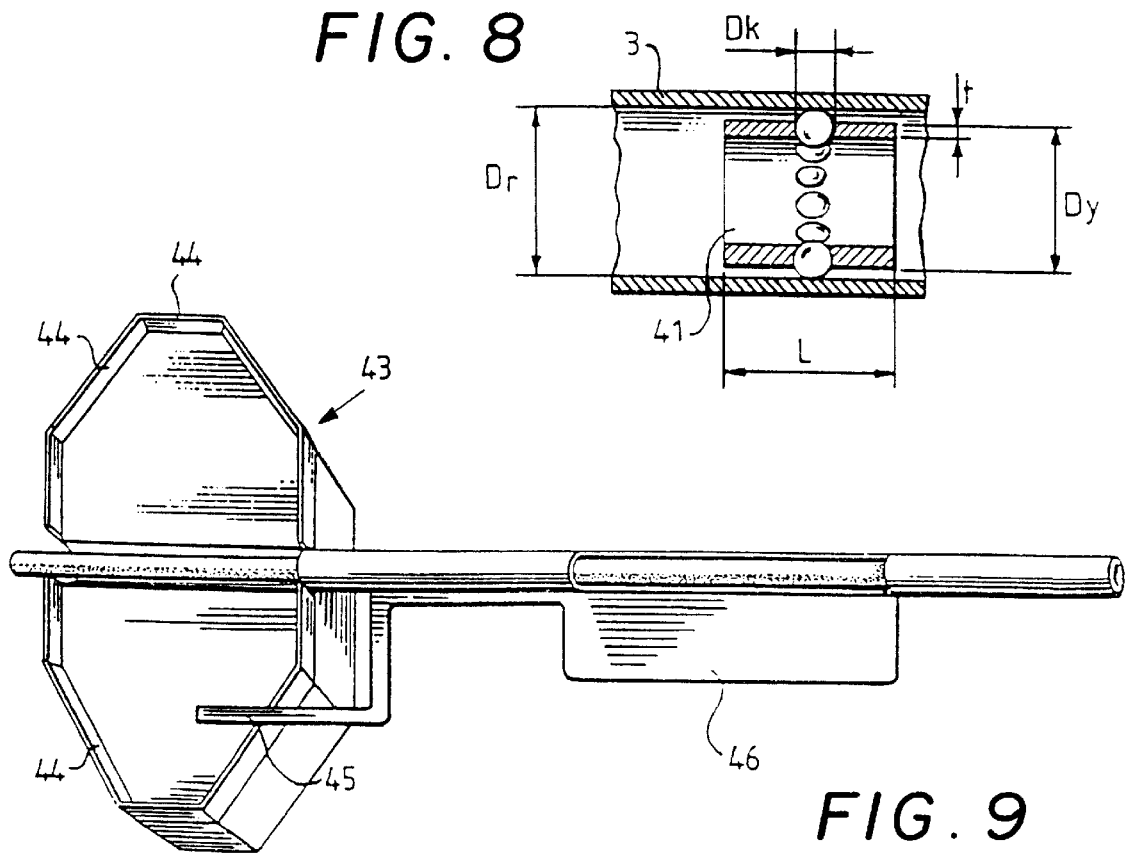
FIG. 9

FIG. 10
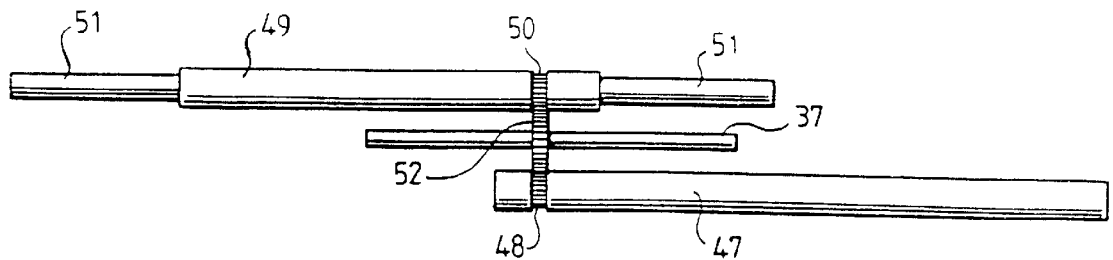
FIG. 11
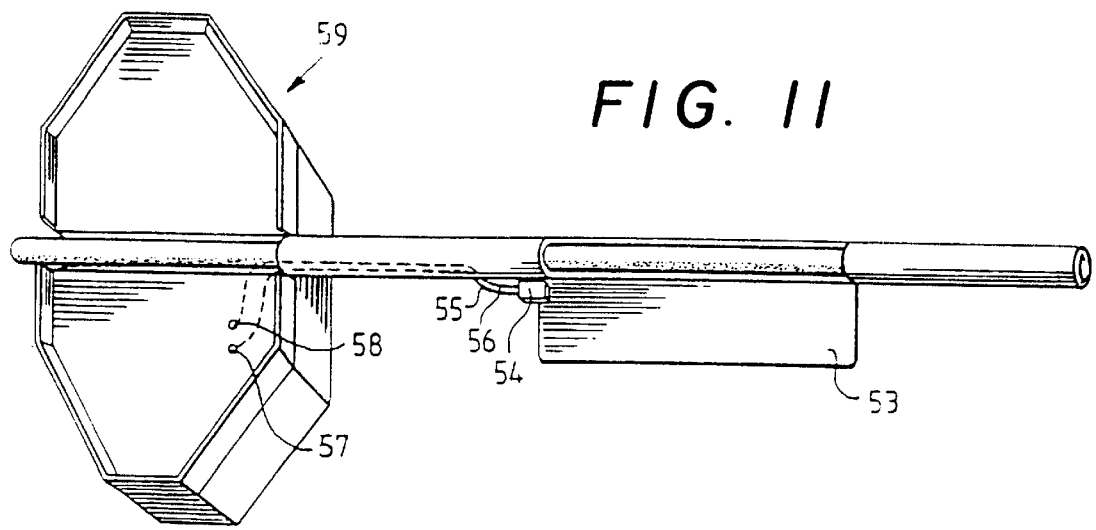
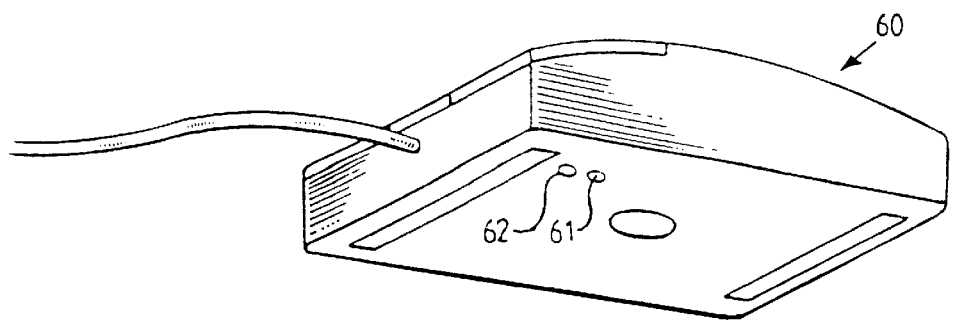
FIG. 11a

CONTROL DEVICE FOR POINTING

TECHNICAL AREA

Control device comprising a rotatable and translatable bar, for control of a pointing device such as a mouse or mouse-pen, associated with the control device. A key for click function is present. Adjustment possibility for different types of pointing devices may be provided for. Means for reducing bearing friction are shown.

PRIOR ART

The mouse herein sometimes referred to broadly as a "Pointing and clicking device" is the most common pointing device for computers and is very well known. Movement of the mouse on the desk brings often about a corresponding movement of a so-called cursor on the computer's screen, referred to as a pointing function. When a clicking function key on the mouse is depressed another function is obtained, referred to as a click function; both functions triggering some computer activity. The kind of activity being triggered depends mostly on where on the screen the cursor is placed.

The mouse has first and foremost the disadvantage that the user is forced to move a hand away from the keyboard when using the mouse, which is time-consuming. The frequent movement of the arm between the keyboard and mouse can give rise to so-called carpal tunnel syndrome, an over-strain.

Furthermore, the mouse requires considerable space on the desk.

Another solution is the mouse-pen, which resembles a pencil. The mouse-pen has in principle the same disadvantages as the mouse for point and click-work at the screen.

A known solution eliminating the disadvantages mentioned above, is provision of a bar which is translatable along and rotatable about its longitudinal axis, and often placed in parallel with and below the spacebar. Rotation of the bar moves the cursor in the vertical direction, and translational sideways movement of the bar moves the cursor sideways on the screen. Such a solution allows, first and foremost, the cursor to move fast and react immediately, thanks to the fact that the thumbs can cooperate easily when manipulating the bar, and that no hand need be moved away from the keyboard. For certain computer programs, where shift between the keyboard and the pointing device seldom occurs, the mouse or mouse-pen may be preferred.

Heretofore known solutions comprising a translatable and rotatable bar, do not permit the user to easily change between the bar and mouse according to one's own choice. U.S. Pat. No. 4,712,101 and U.S. Pat. No. 4,928,093 are representative to such solutions. U.S. Pat. No. 5,115,231 shows a sphere, such as the ball in the mouse, rolling on a rotatable and sideways slideable bar. However, the construction features and advantages associated with the present invention are not shown.

SUMMARY OF THE INVENTION

A device according to the present invention, herein referred to as barcontroldevice, is based on the translatable and rotatable bar concept, but brings about new advantages, as an accessory to pointing devices such as mouse or mouse-pen. Users that already have a mouse or mouse-pen, can at any time get a barcontroldevice, place the mouse or mouse-pen on the barcontroldevice and exploit the advantages described above. The mouse or mouse-pen can thereafter be lifted away easily and used in the conventional manner, for example for drawing work, for which the mouse or mouse-pen may be considered to have advantages, and thereafter be placed on the barcontroldevice again. Hence, both the particular advantages of the barcontroldevice and the mouse can be exploited with a device according to the present invention. The barcontroldevice is furthermore due to its concept as an accessory to pointing devices, totally mechanical and lacks therefore electronics, giving advantages in terms of low manufacturing costs. In one embodiment the bar is slideable, preferably in combination with friction reduction by magnetic means. In a preferred embodiment, balls are utilized for low friction support.

The barcontroldevice can be utilized in connection with a mouse, mouse-pen or the like, even if the term "mouse" generally is used in the description below for the sake of simplicity. Also, it is not intended to limit its use solely in connection with computers.

The barcontroldevice consists primarily of the following parts:

a holder on which a mouse can be placed. The holder is adjustable and is adjusted once and for all to mechanically fit the mouse, or alternatively manufactured for a certain mouse.

a translatable and rotatable bar, passing under the mouse ball. The ball rolls on the bar.

A key for click-function.

The user translates and/or rotates the bar, to obtain pointing function. "Click" takes place by depressing the key for click-function.

DESCRIPTION OF THE FIGURES

FIG. 1 shows a bar included in a barcontroldevice according to the invention,

FIG. 2 shows a barcontroldevice,

FIG. 3 shows the barcontroldevice in end view with a mouse mounted thereupon,

FIGS. 4 and 5 shows mechanics for click-function,

FIG. 6 shows means for friction reducing,

FIG. 7 shows support by means of balls,

FIG. 8 shows some dimensions,

FIGS. 9, 10, 11 and 11a show alternative embodiments.

DESCRIPTION OF THE INVENTION

In connection with FIGS. 1–3, an embodiment of a barcontroldevice 1 is now shown. A pointing function bar 2 is placed in, and is supported by a tube 3. The tube 3 is preferably placed In front of a keyboard, but can be placed anywhere and can even be used in situations where no keyboard is present.

The bar 2 has a surface 5 consisting of rubber or the like. On the bar 2, two bearing rings 6 and 7 are placed, preferably consisting of a low friction plastic material, such as Acetal. The bearing rings 6 and 7, having somewhat larger diameter than the bar 2, makes possible that the bar 2 can slide along its longitudinal axis 8, and can rotate around the longitudinal axis 8 inside the tube 3. The tube 3 has an opening 9 situated such, that the bar 2 can be reached by both thumbs. The tube 3 is supported at its left end by a holder 10, and at its right end by a "right-support" 11. The 4 holder 10 and the right-support 11 rest at the desk 12. The holder 10 consists of two plates 14 and 15, and one plate 16, fastened to the tube 3. The plates 14 and 15 have two upper surfaces, 14a and 15a respectively, being parallel and on flush with one another. The plates 14 and 15 have each two upwards bent tabs 14*b*, 14*c*, and 15*b*, 15*c* respectively, having the purpose to hold the mouse 13 in a sideways position. It can be noted that the tabs 14*b*, 14*c*, 15*b* and 15*c* are inclined outwards, simplifying the placing of the mouse 13.

The plates 14 and 15 are bent in S-shape and meet below the bar 2. They are furnished with feet 14*d* and 15*d*, contacting the desk 12. The plates 14 and 15 can be displaced relative to each other in the direction of double arrow A, and can be locked together by means of a first wing nut 17. The plate 16, fastened to the tube 3, is displaceable relative to the plate 14 in the direction of said double arrow A, and can be locked to the plate 14 by means of a second wing nut 18.

For adjustment of the holder 10 to a mouse 13, the mouse 13 is placed on the plane surfaces 14*a* and 15*a*, after which the plates 14 and 15 are pushed together until the tabs 14*b*, 14*c*, 15*b* and 15*c* barely contact the corners of the mouse. Then, the wing nut 17 is tightened to lock the plates 14 and 15 together. After that, the plate 16 is moved relative to the plate 14 such, that the bar 2 is located under the mouse ball 19, after which the wing nut 18 finally is tightened, locking the plates 14 and 16 together.

The mouse ball 19 now rests on the bar 2, and rolls on the bar 2 when the user moves the bar 2 in the tube 3, and at which the movement of the bar 2 is detected by the mouse 13. Rotation of the bar 2 moves the marker on the screen in a vertical direction, and sideways translation of the bar moves the marker in a sideways direction. Hence, the user can with one or both thumbs reach the bar 2 via the open area 9 in the tube 3, rotate and translate the bar 2, and thereby move the marker on the screen in a very effective manner.

Means for bringing about click function is shown in connection with FIGS. 2, 4 and 5, but is to the largest extent excluded in all other figures for the sake of clarity. A "click-key" or "clicking function key" 20 is pivoted in such a manner that its position can be changed a small angle around the dotted and dashed bearing axis 21. Bearing axis 21 is preferably parallel with the longitudinal axis 8 of the bar; any mutual angle ought not to exceed 30 degrees. The bearing support takes place via pivot pins 22 and 23, located in holes 24 and 25, situated in a bent-down tab of the plate 16 and the right-support 11, respectively. The left part of the click-key 20 is provided with a tab 26. Tab 26 contacts the upper surface of a plate 27, rotatably mounted to the plate 14, so it can tilt a small angle around the dotted and dashed axis 4 via some type of bearing (not shown). The axis 4 is perpendicular to the longitudinal axis 8 of the bar. The plate 27 is provided with a tab 28, placed in a hole 29, in a vertical strip 30. The vertical strip 30, passing through a pilot hole 31 in the plate 14, is provided with a recess 32, in which a pin 33 is placed. The axis 33 has an area 34 with larger diameter than the width of the recess 32. The right end of the pin 33 has a threaded area, on which a nut 35 is screwed on. A tension spring 38, having attachment points in the plate 14 and the plate 27, pulls up the plate 27 against a stop 40, connected to the plate 14 (shown in FIG. 2), resulting in that the front edge 20*a* of the click-key 20 normally is located approximately 4 mm above the desk 12.

The first time the barcontroldevice 1 is adjusted to a mouse, the above described adjustments of the parts 14, 15 and 16 are made. Then the mechanics for click-function are adapted by adjusting the pin 33 to a location in the recess 32, where it barely contacts the left clicking key 36 of the mouse. The nut 35 is then tightened, and the adaptation is ready. Depressing the click-key 20 now results in a corresponding descending movement of the plate 27, the vertical strip 30, axis 33 and the left clicking key 36 of the mouse.

An advantage with the shown arrangement is that the force required for depressing the click-key 20 remains constant, regardless of the mutual position of the click-key 20 and those parts (27, 30 and 33) which depress the left mouse key (said position varying with the mutual position of plates 14 and 16). A further advantage is that the top surface of the click-key 20 is situated only a few millimeters above the surface of the desk; more than 10 millimeters above the keyboard will hamper the possibility to reach the bar 2. Even if another location of the click-key 20 is conceivable, for instance between the bar 2 and the spacebar, the shown location in front of the bar 2 and near the desk 12, is very good from an ergonomic point of view, since the thumbs can be used for conveniently depressing plate 20.

The barcontroldevice can be adapted via the above shown adjustment possibilities to mice of very different shapes. Hence, a user with an existing mouse 13 can get a barcontroldevice 1, adjust the holder 10 to the mouse, thereafter adjust the "click-mechanics" via the above described procedure, and the barcontroldevice is ready to use.

Certain mice have an irregular shape. Adaptation of the holder 10 to such mice requires that one or more of the tabs 14*b*, 14*c*, 15*b* and 15*c* be sideways adjustable in relation to the plates 14 and 15. Mechanical means for this is not shown, but can be implemented easily.

It is possible to arrange a second key (not shown) for actuating the right key of the mouse. However, direct depressing of the right mouse key by the outer part of the left palm of the hand works very well; the right key is relatively seldom used, so the approximately 10 centimeters movement of the left hand which is necessary for this should be acceptable.

The device shown above fits only conventional mice provided with a ball, but not so called optical mice, detecting reflecting patterns in a special pad. However, the barcontroldevice can be adapted to fit even optical mice, by providing at least the part of the bar that is situated under the mice with the proper reflecting patterns. The marker on the screen will also in this case move in the right manner. If the bar surface friction at the same time is relatively high, the barcontroldevice will fit also mice with a ball.

Certain mice can have a ball of considerable weight, which adds to the weight of the bar. It has proven that even if the bearing rings 6 and 7 provide low friction against the inside of the tube 3, the bar 2 can still give a "too stiff" feeling when moved. Contributing to this is not only friction between the bearing rings 6 and 7 against the tube 3, but also the fact that the ball in mice cannot rotate free of friction inside the mouse. The often too high resulting friction can be reduced to a low enough value if the bar 2 contains magnetic material which is attracted by a magnetic circuit, here shown as a ferrite magnet 39 fastened to the tube 3 (FIG. 6). The magnet 39 lifts the bar 2, reducing considerably the contact force of the bar 2 against the inside of the tube 3 and thus the resulting friction.

The lifting force of the magnet 39 may be controlled by adjusting the distance between the magnet 39 and the bar 2 by means of some suitable mechanic (not shown).

A disadvantage by using the magnet 39 is that adjustment of the lifting force might be needed for obtaining lowest friction. The need for adjustment should be avoided if possible; it would be better if the friction without adjustment could be kept at a low and as constant value as possible, eliminating demands on the user to minimize the friction. Further, the magnetic field of the magnet 39 may destroy information on floppy disks if not properly screened; screening (not shown) increases the complexity. Moreover, the play for the bearings 6 and 7 inside the tube 3 must be kept relatively low, in order not go give susceptibility to contaminations which can penetrate between the tube 3 and the bearing rings 6 and 7. The reason why the play in question must be low is the following: if the lifting force of the magnet 39 is set approximately such, that the bar 2 "floats" in the tube 3 (for obtaining low friction), the bar 2 will assume all radial locations in the tube 3 which the play concerned will permit, when the user manipulates it. This can cause jamming if the rubber covering 5 of the bar contacts the lower surface of the mouse; alternatively, the play can cause the bar to drop so much that the mouse ball 19 does not reach it. The problem mentioned above may be especially troublesome in view of the prospect of bearing play increasing because of wear.

Therefore, in FIGS. 7 and 8 are shown a preferred method of supporting the bar 2, eliminating the problems above. No magnet is needed. The bearing ring 6 has been replaced by a number of n balls, denominated $K_1, K_2 \ldots K_n$. In a working prototype, the number of balls were 12. The balls $K_1$–$K_n$ are mutually held in place by a ball cage 41, which is free and not fastened to either the bar 2 or the tube 3. The balls $K_1$–$K_n$ roll between the bar 2 and the tube 3, when the bar 2 is rotated as well as translated. A stop ring 42, secured to the bar 2 and of a slightly less diameter than the inside of tube 3, ensures that the ball cage 41 does not reach a position too far out to the right.

There must be a certain relationship between the outer diameter $D_y$ of the ball cage, tie material thickness t of the ball cage, the length L of the ball cage, the inside diameter $D_r$ of the tube 3, and the ball diameter $D_k$ (FIG. 8). If not, the ball cage 41 runs the risk of being tilted, thereby contacting the bar 2 which would cause sticking. The dimension t must furthermore be so large that the balls do not tend to roll in between the bar 2 and the ball cage 41.

The following rule of thumb does always work:

$$D_r - D_y = 0,10 \text{ mm} \quad L = D_r \quad t = D_k/2.$$

A non-adjustable embodiment is shown in FIG. 9. The mouse (not shown) is held in place by a specially made holder 43, provided with a border 44, fitting the mouse in question and holding the mouse laterally. Further, no mechanical means for adjusting the click key to the mouse key is present, instead an offshoot 45 from the click key 46 goes directly to the left key of the mouse. An advantage of this embodiment is simpler design and that the user does not need to make any adjustments; a disadvantage is that it only fits one type of mouse.

Yet another embodiment is shown in FIG. 10. Mechanical means for actuating the mouse keys is not shown. A first bar 47 is rotatable and translatable in the same manner as the bar 2. The bar 47 has an area 48 provided with teeth, having somewhat smaller outer diameter than the bar 47. A second bar 49 has teeth 50 in a corresponding manner, and slides on a central shaft 51. The bars 47 and 49 are connected via an intermediate gearwheel 52, able to rotate and slide on a stationary shaft 37. The bar 47 is manipulated by the user, and the mouse ball rolls on the bar 49. Rotation and/or translation of the bar 47, results via the gearwheel 52 in a corresponding rotation and/or translation of the bar 49.

This embodiment does exemplify that intermediate mechanical means (i.e. the gearwheel 52 and the bar 49) may be present between the bar that is manipulated by the user (i.e. bar 47 in this case) and the detection means 35 of the mouse (the ball). The important thing is however that the mouse detects (indirectly) the movement of the bar 47.

In FIGS. 11 and 11a yet another embodiment is shown. Here, a click-key 53 actuates an electrically closing contact 54, connected via wires 55 and 56 to contact points 57 and 58 on the holder 59. The mouse 60 (shown in FIG. 11a is provided with clicking function contact points 61 and 62, contacting the contact points 57 and 58 when the mouse 60 is placed on the holder 59. Depressing the click-key 53 now results in click-function, if the mouse 60 is able to detect electrical closing between its contact points 61 and 62.

The advantage of this embodiment is its somewhat simpler mechanics, especially if the number of click-keys are increased, its disadvantage may be that it requires a specially made mouse.

Many modifications can be made; some examples are given below. The number of click-keys can for all embodiments be increased. The mouse holder can also be located next to the right side of the keyboard. Further, the bar 2 can be supported in other ways than those described; for instance slide (or roll with balls in cage) on a central pin; this arrangement has the disadvantage that a left support for the central pin must be located a considerable distance from the left side of the holder 10. The tube 3 may be movable along its longitudinal axis as well; in which case the tube 3 would be slideable relative to a supporting structure and thus able to follow sideways movement of the bar 2. This makes very little difference concerning the bar 2; it would still be rotatable and translatable about and along its longitudinal axis. The barcontroldevice may also be integrated in a keyboard. Also other modifications are conceivable and may be made by professionals.

I claim:

1. A control device for a computer pointing and clicking device having a pointing input motion responsive means and a clicking input motion responsive means, comprising:

a pointing and clicking device support for receiving and supporting a pointing and clicking device;

an axially movable and rotatable elongated pointing function bar having a longitudinal axis and associated with the pointing and clicking device support such that the bar may be located so as to cooperate with a pointing input motion responsive means of a clicking and pointing device that may be located on the clicking and pointing support;

a bar support for radially supporting and maintaining the pointing function bar in association with the pointing and clicking device support and for enabling axial and rotational movements of the bar; and a clicking function key associated with the pointing and clicking device support and the pointing function bar, said key including means for cooperating with and actuating a clicking means of a pointing and clicking device that may be located on the pointing and clicking device support.

2. A control device as claimed in claim 1, wherein said clicking function key is movable and includes means for transmitting movement of the clicking function key to a clicking means that may be located on the pointing and clicking support.

3. A control device as claimed in claim 1, said pointing and clicking support device including means for restraining at least lateral motion of a pointing and clicking device located on the pointing and clicking device support.

4. A control device as claimed in claim 3, wherein said means for restraining comprises surfaces that slope upwardly and outwardly from the pointing and clicking device support.

5. A control device as claimed in claim 2, including a clicking function key support arranged to support the clicking function key for rotational motion about an axis of rotation; said clicking function key support arranged to maintain said axis of rotation within an angle of 30° with respect to the longitudinal axis of the pointing function bar.

6. A control device as claimed in claim 1, including position adjusting means for varying the position of the pointing function bar relative to the pointing and clicking device support.

7. A control device as claimed in claim 1, including position adjusting means for varying the position of the means for cooperating with and actuating a clicking means relative to the pointing and clicking device support.

8. A control device as claimed in claim 6, including position adjusting means for varying the position of the means for cooperating with and actuating a clicking means relative to the pointing and clicking device support.

9. A control device as claimed in claim 1, said clicking function key being movable; said means for cooperating with and actuating a clicking means including a pivotable member associated with the pointing and clicking device support; and means for transmitting motion of the clicking function key to said pivotable member.

10. A control device as claimed in claim 9, said clicking function key being mounted for rotational motion about an axis extending generally parallel to the longitudinal axis of the pointing function bar; said means for transmitting motion including means for converting rotational motion of the clicking function key to non-rotational motion at the point of actuation of a clicking means of a pointing and clicking device.

11. A control device as claimed in claim 8, said pointing and clicking device support including first and second relatively movable surfaces; and a third member connected to said bar support, said third member movable relative to at least one of said first and second surfaces; and means for locking said three members against relative movement.

12. A control device as claimed in claim 3, wherein at least one of said means for restraining at least lateral motion is adjustable to accommodate various size clicking and pointing devices on the pointing and clicking device support.

13. A control device according to claim 1, including means for supporting said clicking function key not more than 10 mm above a support surface located below the clicking function key.

14. A control device as claimed in claim 1, said bar including a manipulation area, and said pointing function bar including a friction enhancing material at least at the area whereat the bar is to be manipulated.

15. A control device as claimed in claim 1, said pointing function bar having an area arranged to engage a pointing input responsive means of a pointing and clicking device, and including a friction enhancing material at an area thereon engageable with a pointing input motion responsive means of a clicking and pointing device that may be located in the clicking and pointing device support.

16. A control device as claimed in claim 14, said pointing function bar having an area arranged to engage a pointing input responsive means of a pointing and clicking device, and including a friction enhancing material on an area thereof engageable with a pointing input motion responsive means of a clicking and pointing device located on said pointing and clicking device support.

17. A control device according to claim 1, said bar support including a bearing element comprising a plurality of rotatable balls in a ball cage, said bearing element radially supporting the pointing function bar for low friction rotational and axial movement relative to said bar support while maintaining relative alignment between the pointing function bar and said pointing function bar support.

18. A control device according to claim 1, said bar support including at least one slide bearing ring for radially supporting the pointing function bar.

19. A control device according to claim 18, wherein said pointing function bar includes magnetic material and including magnetic means acting on the pointing function bar for reducing friction between the slide bearing ring and the bar support.

20. A control device according to claim 17, wherein said bar support is located towards one side of said pointing and clicking device support.

21. A control device according to claim 18, wherein said bar support is located towards one side of said pointing and clicking device support.

22. A control device according to claim 1, said pointing function bar including an optical pattern for cooperating with a pointing function input motion responsive means of an optical type pointing and clicking device having input motion responsive means responsive to relative movement between the input motion responsive means and an optical pattern.

\* \* \* \* \*